(12) United States Patent
Sebire et al.

(10) Patent No.: US 8,660,561 B2
(45) Date of Patent: Feb. 25, 2014

(54) MBMS FEEDBACK AND NEIGHBORING CELL MEASUREMENT REPORTING

(75) Inventors: Guillaume Sebire, Espoo (FI); Antti O. Kangas, Oulunsalo (FI)

(73) Assignee: Nokia Corporation, Espoo (FI)

( * ) Notice: Subject to any disclaimer, the term of this patent is extended or adjusted under 35 U.S.C. 154(b) by 2043 days.

(21) Appl. No.: 11/351,281

(22) Filed: Feb. 8, 2006

(65) Prior Publication Data

US 2006/0221888 A1    Oct. 5, 2006

Related U.S. Application Data

(60) Provisional application No. 60/667,144, filed on Mar. 30, 2005.

(51) Int. Cl.
*H04W 36/00* (2009.01)
(52) U.S. Cl.
USPC ........... 455/438; 455/436; 455/437; 455/439; 455/440; 455/561; 370/331; 370/335; 370/437
(58) Field of Classification Search
USPC ........... 455/432.3, 436, 422.1, 437, 439, 442, 455/444, 456.3, 414.2, 438, 440, 561, 450, 455/452.1, 452.2; 370/331, 329, 346, 332, 370/333, 335, 437, 431
See application file for complete search history.

(56) References Cited

U.S. PATENT DOCUMENTS

| | | | |
|---|---|---|---|
| 5,517,674 A | 5/1996 | Rune | |
| 5,633,874 A | 5/1997 | Diachina et al. | |
| 7,421,272 B2 * | 9/2008 | Dalsgaard et al. | 455/438 |
| 7,509,127 B2 * | 3/2009 | Wang et al. | 455/439 |
| 7,953,034 B2 * | 5/2011 | Lee et al. | 370/312 |
| 2003/0134640 A1 * | 7/2003 | Kim et al. | 455/438 |

(Continued)

FOREIGN PATENT DOCUMENTS

| | | |
|---|---|---|
| EP | 1372350 | 12/2003 |
| EP | 1467586 | 10/2004 |

(Continued)

OTHER PUBLICATIONS

3GPP TS 43.246 v6.2.0 (Jan. 2005); 3rd Generation Partnership Project; Technical Specification Group GSM/EDGE Radio Access Network; *Multimedia Broadcast Multicast Service (MBMS) in the GERAN*; Stage 2, (Release 6).

(Continued)

*Primary Examiner* — Charles Appiah
(74) *Attorney, Agent, or Firm* — Squire Sanders (US) LLP

(57) ABSTRACT

A method and equipment by which a mobile station receiving a point-to-multicast (p-t-m) transmission from a radio access network (RAN) of a wireless communication system communicates information to the RAN of use in the mobile changing to a neighboring cell for receiving the p-t-m transmission; in particular, the mobile station indicates to the RAN whether cell reselection parameters for the neighboring cell have been received, and/or whether neighboring cell information indicating parameters for receiving the p-t-m transmission in the neighboring cell have also been received by the mobile. In a typical embodiment, the mobile would indicate not only whether parameters for receiving the p-t-m transmission in the neighboring cell have been received, but which set of parameters have been received. The information of use in the mobile changing to the neighboring cell is communicated to the RAN in an acknowledgment message uplinked on a packet access control channel.

11 Claims, 2 Drawing Sheets

(56) References Cited

U.S. PATENT DOCUMENTS

| | | | |
|---|---|---|---|
| 2004/0081140 | A1 | 4/2004 | Martin |
| 2004/0213214 | A1* | 10/2004 | Jung et al. .................... 370/352 |
| 2006/0067353 | A1* | 3/2006 | Pekonen et al. ............. 370/432 |
| 2006/0068780 | A1* | 3/2006 | Dalsgaard et al. ......... 455/432.3 |
| 2006/0079242 | A1* | 4/2006 | Vaittinen et al. ............. 455/453 |
| 2006/0251019 | A1* | 11/2006 | Dalsgaard et al. ........... 370/331 |
| 2007/0099621 | A1* | 5/2007 | Bergqvist et al. ............ 455/445 |
| 2009/0264133 | A1* | 10/2009 | Lee et al. ...................... 455/436 |
| 2010/0022242 | A1* | 1/2010 | Nizri et al. ................. 455/435.2 |
| 2010/0255838 | A1* | 10/2010 | Wu .............................. 455/434 |

FOREIGN PATENT DOCUMENTS

| | | |
|---|---|---|
| EP | 1686827 | 8/2006 |
| JP | 2004-312750 | 11/2004 |
| WO | 03017713 | 2/2003 |
| WO | WO 03/071797 | 8/2003 |
| WO | WO 2005/020474 | 3/2005 |
| WO | 2005046285 | 5/2005 |

OTHER PUBLICATIONS

3GPP TS 22.146 v7.0.0 (Dec. 2005); 3rd Generation Partnership Project; Technical Specification Group Services and System Aspects; *Multimedia Broadcast/Multicast Service*; Stage 1, (Release 7).

GP-042013; *Assisted Cell Change during MBMS p-t-m transmission*; Siemens, Telecom Italia S.p.A, Vodafone. 3GPP TGS GERAN#21, Montreal, Canada.

3GPP TS 45.008 v6.11.0 (Jan. 2005); 3rd Generation Partnership Project; Technical Specification Group GSM/EDGE Radio Access Network; *Radio subsystem link control* (Release 6).

3GPP TS 44.060 v6.1 1.1 (Feb. 2005); 3rd Generation Partnership Project; Technical Specification Group, GSM/EDGE Radio Access Network; General Packet Radio Service (GPRS); Mobile Station (MS)—Base Station System (BSS) Inteface; *Radio Link Control/Medium Access Control (RLC/MAC) protocol* (Release 6).

3GPP TS 44.018 v4.20.0 (Jan. 2005); 3rd Generation Partnership Project; Technical Specification Group GSM/EDGE Radio Access Network; Mobile radio interface layer 3 specification, *Radio Resource Control (RC) protocol* (Release 4).

Japanese Office Action issued on Mar. 18, 2010 in Japanese counterpart application No. 2008-503604 (3 pages).

English language translation of JP Office Action (4 pages).

English language abstract of JP 2004-312750 (1 page).

H. Jenkac et al., "Retransmission Strategies for MBMS over GERAN," IEEE Communications Society, WCNC 2005, pp. 1773-1779 (7 pages).

Extended European Patent Office Search Report issued Jul. 21, 2011 in counterpart EP patent application No. 06710347.3 (3 pages).

Taiwanese Official Letter dated Aug. 17, 2012 issued on corresponding Application No. 095110204.

Chinese Office Action, dated Jun. 11, 2012; Issued on corresponding Application No. 20068001791.X.

Rejecting Decision dated Sep. 29, 2012, for corresponding Chinese Patent Application No. 200680010791.X.

Office Action dated Apr. 2, 2013 issued in corresponding Chinese Patent Application No. 200680010791.X.

Office Action mailed Aug. 5, 2013 issued in corresponding Chinese Patent Application No. 200680010791.X (with English translation).

Office Action dated Oct. 1, 2013, issued in corresponding EP Patent Application No. 06 710 347.3.

\* cited by examiner

MBMS FEEDBACK AND NEIGHBORING CELL MEASUREMENT REPORTING

CROSS REFERENCE TO RELATED APPLICATION

Reference is made to and priority claimed from U.S. provisional application Ser. No. 60/667,144, filed 30 Mar. 2005.

BACKGROUND OF THE INVENTION

1. Technical Field

The present invention pertains to the field of cellular communication. More particularly, the present invention pertains to wireless transmission of point-to-multipoint data (e.g. MBMS data) to mobile stations and cell changes of mobile stations in connection with such transmissions.

2. Discussion of Related Art

MBMS (Multimedia Broadcast/Multicast Service) is a unidirectional point to multipoint (p-t-m) bearer service in which data is transmitted from a single source entity to multiple recipients. MBMS is used to provide for example streaming video and audio.

An example of MBMS is that provided by GPRS (General Packet Radio Service) of a GSM (Global System for Mobile Communications)/EDGE (Enhance Data rate for GSM Evolution (EDGE) radio access network (GERAN). The Third Generation Partnership Program Technical Specification 3GPP TS 43.064 contains an overview of the GPRS radio interface (Um reference point). 3GPP TS 43.051 is an overall description of the GSM/EDGE Radio Access Network (GERAN) in so-called Iu mode.

For some cellular communication systems (such as GSM), a mobile station acquiring an MBMS session on a p-t-m channel provided by a network implementing a cellular communication system, if polled by the network, is configured to report an acknowledgement message giving the status of data received for the session up until the mobile station is so polled (as set out in 3GPP TS 43.246 and 3GPP TS 44.060). Such status information is used by the network to trigger retransmissions of data blocks not received by some mobile stations.

A mobile station is also expected (at least in some networks) to report up to the six strongest non-serving carriers to the network in a single acknowledgement message. The reporting of non-serving carriers is used by the network to allow for prioritizing the transmission of MBMS Neighboring Cell Information (MNCI) messages for cells indicated as most likely targets for cell changes by mobile stations, over those for cells that are less likely targets. This increases the chances that a mobile station has received neighboring cell p-t-m parameters for a given session for a cell—which parameters are included in the MNCI and which it needs in order to receive the MBMS session in the cell—before it changes to the cell, so the mobile station can quickly continue acquiring the session after cell change to the cell.

In order for a mobile station to access a target cell, the cell reselection parameters of the target cell must be known by the mobile station. Well-known so-called SI2n messages are scheduled by the network in a serving cell to provide such information for a target cell, as opposed to letting the mobile station tune to the target cell and thereby acquire the parameters.

Thus, a mobile station receiving an MBMS session in one cell and in a situation where it is likely that the mobile station should change to a new cell to continue the session, must know the corresponding p-t-m parameters for the new cell and also the cell reselection parameters for the new cell. It would be advantageous for a mobile station to cooperate with the network to ensure that the mobile station has such p-t-m parameters and cell reselection parameters.

DISCLOSURE OF INVENTION

The invention therefore provides a method (and corresponding equipment and computer program products and application specific integrated circuits), comprising: a step in which a mobile station receiving from a network a point-to-multipoint data channel (e.g. an MBMS channel) forms a message including an indication of whether cell reselection parameters for a neighboring cell have been received by the mobile station, and/or an indication of whether the mobile station has received neighboring cell information (e.g. MNCI) for the neighboring cell, indicating a set of parameters to be used in receiving the point-to-multipoint data channel in the neighboring cell; and a step in which the mobile station transmits the message to the network on a control channel (e.g. PACCH).

In accord with the invention, if the mobile station has received the neighboring cell information for the neighboring cell indicating a set of parameters to be used in receiving the point-to-multipoint data channel in the neighboring cell, the mobile station may also include in the message an indicator for indicating which of possibly different sets of parameters received by the mobile station the mobile station has received.

Also in accord with the invention, the message may be formed and transmitted in response to a poll from a source transmitter of the point-to-multipoint data.

The invention also provides a mobile station including hardware and software for performing a method according to the first aspect of the invention, and a network element for participating in a cell change operation for a mobile station, taking into account information received from the mobile station according to the invention.

According to some embodiments, the invention may take the form of a computer program product comprising a non-transitory computer readable storage structure embodying computer program code thereon for execution by a computer processor, wherein said computer program code comprises instructions for performing the aforementioned method.

BEST MODE FOR CARRYING OUT THE INVENTION

Figure 1:
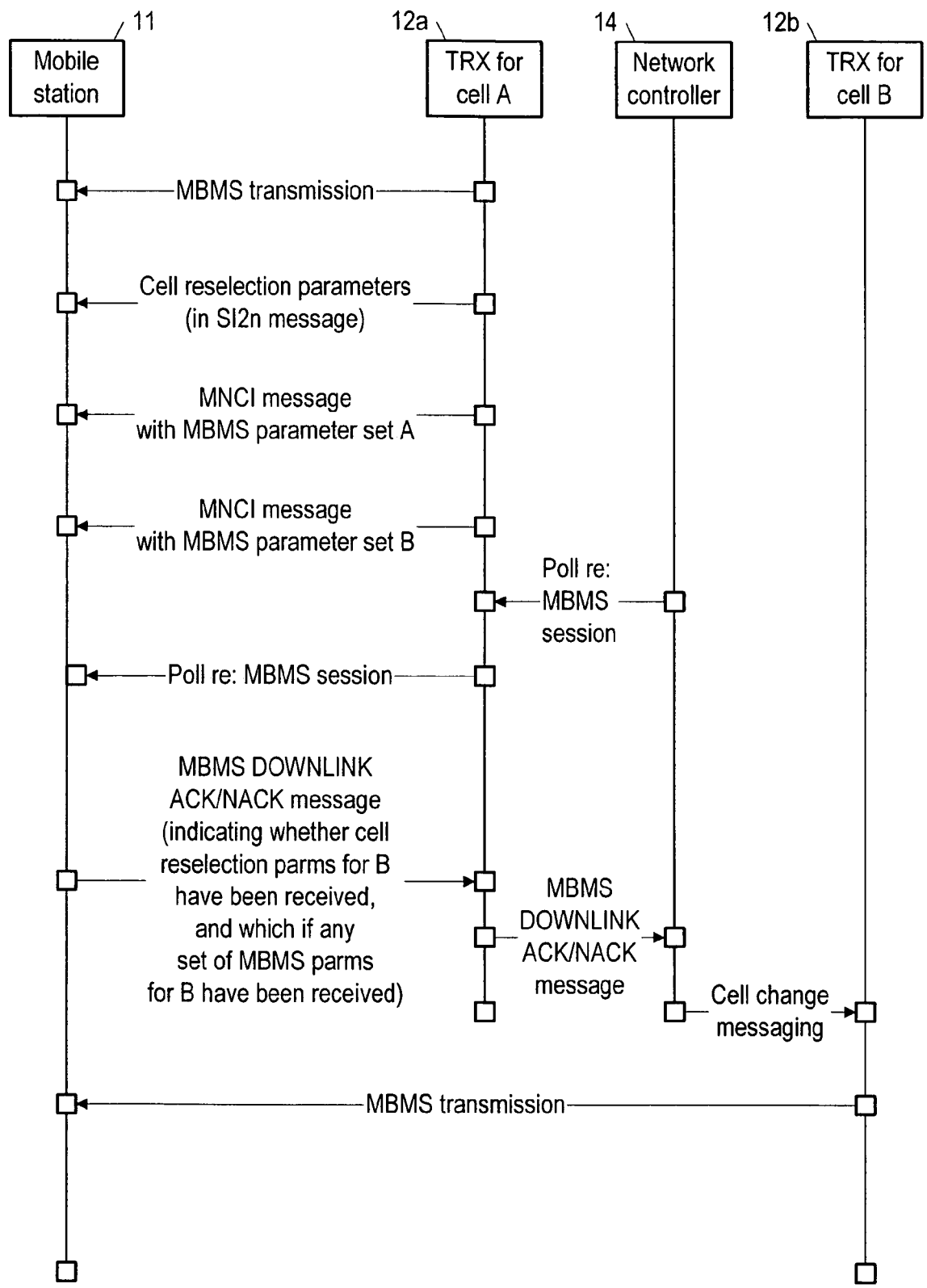
FIG. 1 is a schematic illustrating communications according to the invention between a mobile station and a network for a cellular communication system, in case of the mobile station receiving an MBMS session in a cell of the network.

The invention is of use in case of a mobile station interfacing with a GSM/EDGE Radio Access Network (GERAN) in connection with a point-to-multipoint transmission from the GERAN. (Such interfacing is covered in Third Generation Partnership Program Technical Specifications 3GPP TS 43.246 and 3GPP TS 44.060.) The invention is also of use in case of other kinds of radio access networks.

According to the invention, a message is sent by a mobile station to a network providing to the mobile station, in a point-to-multipoint (p-t-m) transmission (i.e. via a point-to-multipoint data channel), an MBMS session, with the message indicating to the network whether the mobile station has already received some or all of the information needed to continue to receive the MBMS session if a cell change is made to a (given) new (neighboring) cell. According to the invention, then, the mobile station informs the network whether it has already received either cell reselection parameters for the neighboring cell (the identity of the neighboring cell also being indicated in the message) and/or the p-t-m parameters for the session for the neighboring cell. More specifically, the message the mobile station sends to the network contains an indication of whether the mobile station has received cell reselection parameters for the neighboring cell (i.e. the information pertaining to the neighboring cell which the mobile station needs to be able to evaluate—and possibly reselect to—the neighboring cell as per the defined one or more cell reselection algorithms), and/or an indication of whether the mobile station has received information on p-t-m parameters for the neighboring cell (which would typically be included in the MNCI for the neighboring cell), i.e. information indicating a set of parameters to be used by the mobile station in receiving the MBMS session in the neighboring cell immediately following the cell reselection.

In some embodiments, the mobile station also includes in the message an indicator of which set of p-t-m parameters (which change over time relatively often, as discussed below) for the neighboring cell most recently received by the mobile station. The p-t-m parameters themselves need not be indicated, but instead only some sort of index/version number (also referred to as "change mark").

Also, in some embodiments (but not necessarily), the message is formed and transmitted in response to a poll from a source transmitter of the point-to-multipoint data, i.e. from a transceiver of the network. Thus, in such embodiments, a message according to the invention is an acknowledgment message, and a suitable designation would be an MBMS downlink ACK/NACK message.

Cell reselection parameters (provided typically by means of an SI2n message by the network) are (relatively) static, and so the indication of whether the mobile station has received such parameters for a neighboring cell is advantageously provided by means of a single bit, as follows:
RESEL_PARAMS_ACQUIRED: bit (1)
Bit
0   Reselection parameters not acquired
1   Reselection parameters acquired
In contrast to the cell reselection parameters, the p-t-m parameters/information for a cell (provided as part of MNCI) is dynamic information; the network may reconfigure a p-t-m channel for different sessions. A mobile station advantageously, according to the invention, indicates whether it has received any p-t-m parameters for a session, and if so what p-t-m parameters it has received, so as to guarantee the network is able to identify whether this information is outdated or not. If by means of this indication the network detects that the mobile station has received only outdated information, the network may need to send updated p-t-m information pertaining to the specified neighboring cell in the serving cell. In order to indicate what p-t-m parameters the mobile station has received, the invention provides a change mark indication of one or more bits. Such a change mark serves as an identifier to a given set of parameters sent by the network.

For example, according to the invention, the network provides a change mark (MBMS_P-T-M_CHANGE_MARK) for given p-t-m parameters for a given session provided in an MNCI message, as follows:
<MBMS_P-T-M_CHANGE_MARK: bit(2)>.
When the mobile station receives the MNCI message, it stores the value of the indicated MBMS_P-T-M_CHANGE_MARK for the session if it is acquiring that particular session (storing it typically only until a MNCI with a new MBMS_P-T-M_CHANGE_MARK is received or until the mobile station changes cells, whichever occurs first). Next, the mobile station provides, if available for a reported neighbor, the stored MBMS_P-T-M_CHANGE_MARK for that session in the message, as follows:
{0—No p-t-m parameters acquired
|1<MBMS_P-T-M_CHANGE_MARK: bit(2)>}—P-t-m parameters acquired
i.e., if the p-t-m parameters have not been received, a single bit of value 0 is sent by the mobile station; if, however, the p-t-m parameters have been received, a first bit of 1 is provided, and a two-bit indicator identifying the set of p-t-m parameters that have been received is included in the message. (The two-bit indicator may reference simply the latest copy of the MNCI received by the mobile station, as opposed to a particular set of p-t-m parameters; with such information the network can still determine whether to resend the latest MNCI.)

Upon reception of the message from the mobile station, the network is able to detect for the session any discrepancy between the change mark reported by the mobile station, and the latest change mark sent by the network, for any given reported neighbor. If no change mark is reported by the mobile station, the network may decide to send an MNCI message containing the needed parameters. This indication may also be used as a trigger to initiate the data transfer for a particular session in a given cell (if not already started).

The change mark may be provided as additional information in what is called an MBMS DOWNLINK ACK/NACK message, in case of embodiments in which the change mark is provided in response to polling. Such a message could include the change mark indication in the section indicated as "NC Report struct" as indicated as follows:

```
< MBMS Downlink Ack/Nack message content > ::=
     < DOWNLINK_TFI : bit (5) >
     < MBMS NC Report : < MBMS NC Report struct > > -- Neighboring cell reporting
     { 0     < Ack/Nack Description : < Ack/Nack Description IE > > -- Ack/Nack information
     | 1     < MS_OUT_OF_MEMORY : bit (1) >
             < EGPRS Ack/Nack Description : < EGPRS Ack/Nack Description IE > > }
< MBMS NC Report struct > ::=
     { 0     < BA_USED : bit (1) >
     | 1     < PSI3_CHANGE_MARK : bit (2) > }
     < NC Report : < NC Report struct > >;
< NC Report struct > ::=
     < RXLEV_SERVING_CELL : bit (6) > -- Serving cell Rx level
     < NUMBER_OF_NC_MEASUREMENTS : bit (3) >
     {       < NCELL_LIST_INDEX_N : bit (5) > -- Neighboring cells Rx levels
             { 0 | 1 < BSIC_N : bit (6) > }
```

```
        < RXLEV_N : bit (6) >
        < RESEL_PARAMS_ACQUIRED : bit (1) >
        { 0
        | 1      < MBMS_P-T-M_CHANGE_MARK : bit (2) > }
    } * val (NUMBER_OF_NC_MEASUREMENTS);
< Ack/Nack Description IE > ::=
    < FINAL_ACK_INDICATION : bit (1) >
    < STARTING_SEQUENCE_NUMBER : bit (7) >
    < RECEIVED_BLOCK_BITMAP : bit (64) > ;
< EGPRS Ack/Nack Description IE > ::=
    { 0     < EGPRS Ack/Nack Description struct > -- This IE fills rest of message
    | 1     < Length L : bit (8) > } -- Value part of this IE is of length L
    < bit (val(Length L)) > & < EGPRS Ack/Nack Description struct > ;
< EGPRS Ack/Nack Description struct > ::=
    < FINAL_ACK_INDICATION : bit (1) >
    < BEGINNING_OF_WINDOW : bit (1) >
    < END_OF_WINDOW : bit (1) >
    < STARTING_SEQUENCE_NUMBER : bit (11) >
    { 0 | 1         < COMPRESSED_BITMAP_LENGTH: bit (7) >
                    < COMPRESSED_BITMAP_STARTING_COLOR_CODE: bit (1) >
                    < COMPRESSED_RECEIVED_BLOCK_BITMAP : bit
(val(COMPRESSED_BITMAP_LENGTH)) > }
    < UNCOMPRESSED_RECEIVED_BLOCK_BITMAP: bit** > ;
```

In the above possible encoding above, the fields other than those associated with the change mark indication and reselection parameter availability are defined in 3GPP TS 44.060 and are already used in one or another prior art message. Such prior art fields are gathered from more than one prior art message and included in the above message because they are particularly useful for feedback in receiving an MBMS session. Thus, the message above does not exist as such in the prior art, even excluding the new fields provided by the invention. In the encoding above, neighboring cell reporting (strength of signal for the neighboring cell) is provided before the acknowledgement information.

The message is a point-to-point message sent in uplink, i.e. from the mobile to the network (providing the MBMS session), on a control channel, such as PACCH (the Packet Associated Control Channel), used generally to signal information related to a given GPRS mobile, such as acknowledgement of received data and other relevant information. Note that Final_Ack_Indication might not be needed in MBMS.

Figure 2:
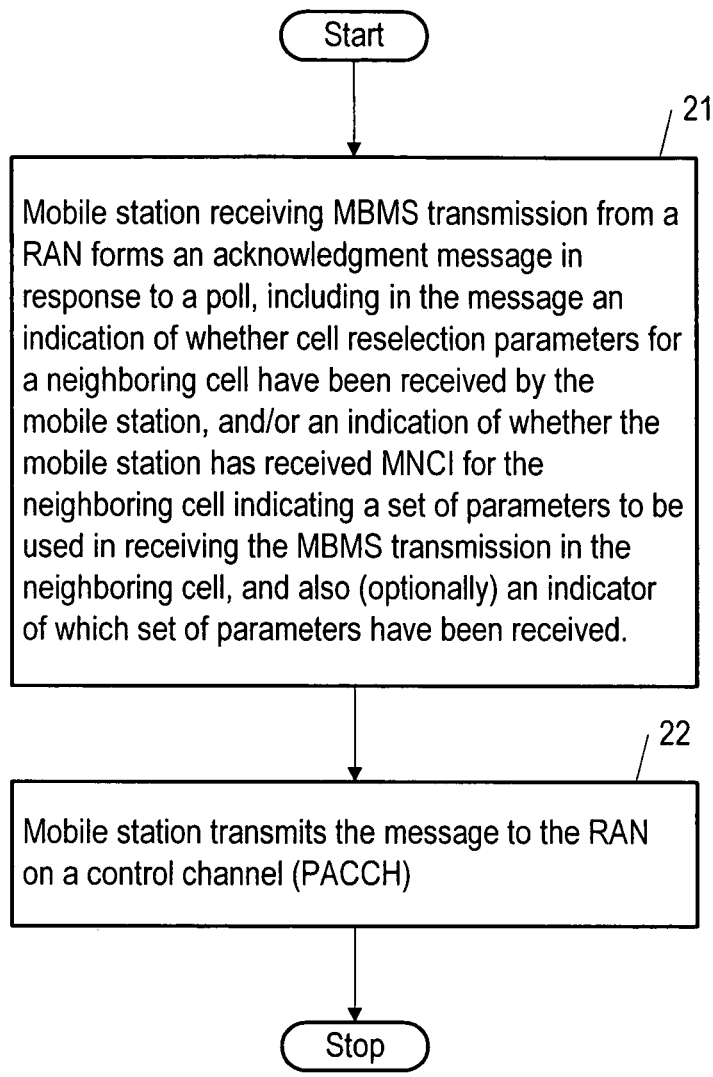
FIG. 2 is a flow chart illustrating operation of a mobile station according to the invention.

Referring now to FIGS. 1 and 2, according to the invention in one embodiment, a mobile station 11, while receiving an MBMS session from a transceiver (TRX) 12a serving cell A of a network providing cellular communication, at some point in time while receiving the MBMS session also receives cell reselection parameters (in an SI2n message) indicating information for changing to a neighboring cell, indicated as cell B served by a second TRX 12b. In addition, the mobile station also receives a first set A and then a second set B of MBMS parameters for cell B, communicated as part of an MNCI message. A network controller 14 then polls the mobile station, and in response, the mobile station, in a step 21, forms an MBMS Downlink ACK/NACK message (i.e. an acknowledgement to an MBMS downlink message, which acknowledgement is sent in uplink) including (in this embodiment, but not necessarily in all embodiments) an indication that the mobile station has received the cell reselection parameters (parms) for cell B, and/or an indication that set B of the MBMS parameters for cell B (the set B information for receiving the MBMS p-t-m transmission via cell B) has been received. In a next step 22, the mobile station transmits the message to the network (via cell A) on PACCH. The network can then use this information in cooperating with the mobile station to change to cell B, after which the mobile station can then continue to receive the MBMS session. (Of course the mobile station may change cells autonomously too, in which case the feedback provided by the mobile station as the above message would likely enhance the chances that the mobile station is in receipt of the information needed to continue to receive the MBMS session in whatever cell it changes to, since the network would see from the feedback whether to send additional parameters for any of the cells the mobile station is likely to change to.)

As indicated above, the step 22 in which the mobile station transmits a message indicating cell reselection parameters and/or the information for receiving a p-t-m transmission via a neighboring cell need not necessarily be provided always and only in response to polling, but could also or instead be provided when triggered by one or another event, such as the event of receiving new information on a p-t-m transmission, or when a regularly scheduled reporting time occurs. Further, the message need not necessarily indicate the latest version of the p-t-m parameters for a neighboring cell (i.e. the latest version of the information the mobile station has received on how to receive an MBMS transmission in the neighboring cell).

The invention also provides computer program products and corresponding application specific integrated circuits (ASICs) for use by a mobile station and computer program products for use by a network (e.g. the transceivers or controllers of a radio access network part of a network providing a cellular communication system), as well as mobile stations and network equipment operative according to the invention as illustrated e.g. in FIG. 2 (although, as indicated above, the message indicated in FIG. 2 as sent by the mobile station need not be sent in response to polling, and need not include an indicator of the latest version of p-t-m parameters the mobile has received). Thus, e.g., the invention provides not only a mobile station that sends a message including an indication of whether cell reselection parameters and also p-t-m parameters (or MNCI including same) have been received (and indicating possibly which set of p-t-m parameters or MNCI has been received), but also network equipment for receiving and processing the fields of such a message, and in particular, for determining whether cell reselection parameters and/or p-t-m parameters for a cell must be sent to a mobile station (or to several mobile stations, or simply broadcast).

The invention also provides a mobile station including hardware and software equipment for performing the method indicated above, and also a network element of a cellular communication system, including hardware and software for participating in a cell change of a mobile station to a neighboring cell by providing a message to the neighboring cell directing that the cell change be performed and indicating to the neighboring cell whether the mobile station should be provided with either cell reselection parameters for the neighboring cell or neighboring cell information for the neighboring cell or both, based on a message provided to the network element by the mobile station including an indication of whether cell reselection parameters for the neighboring cell have been received by the mobile station, and/or an indication of whether the mobile station has received neighboring cell information for the neighboring cell indicating a set of parameters to be used in receiving a point-to-multipoint data channel in the neighboring cell.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   receiving, by a mobile station, a point-to-multipoint data channel from a network;
   forming, by the mobile station, a message including an indication of whether cell reselection parameters for a neighboring cell have been received by the mobile station and an indication of whether the mobile station has received information indicating a set of parameters to be used in receiving the point-to-multipoint data channel in the neighboring cell; and
   transmitting, by the mobile station, the message on a control channel to the network.

2. A method as in claim 1, wherein when the mobile station has received the neighboring cell information for the neighboring cell indicating the set of parameters to be used in receiving the point-to-multipoint data channel in the neighboring cell, the mobile station also includes in the message an indicator of the set of parameters received by the mobile station.

3. A method as in claim 1, wherein the message is formed and transmitted in response to a poll from a source transmitter of the point-to-multipoint data.

4. A computer program product comprising a non-transitory computer readable storage structure embodying computer program code thereon for execution by a computer processor, wherein said computer program code comprises instructions for performing the method of claim 1.

5. A mobile station including a device as in claim 4.

6. A system, comprising:
   a mobile station as in claim 5; and
   a radio access network including a transceiver for wirelessly communicatively coupling to the mobile station, and for providing a transmission of the neighboring cell information for the neighboring cell and/or the cell reselection parameters for the neighboring cell, and also including a network element communicatively coupled to the transceiver, responsive to the message provided by the mobile station to the network, comprising means for participating in a cell change of the mobile station to the neighboring cell by providing a message to the neighboring cell directing that the cell change be performed and indicating to the neighboring cell whether the mobile station should be provided with either the cell reselection parameters for the neighboring cell or the neighboring cell information for the neighboring cell or both, based on the message provided to the network element by the mobile station.

7. A method as in claim 1, wherein the apparatus is configured to form the message in response to a poll from a source transmitter of the point-to-multipoint data.

8. A system, comprising:
   a mobile station configured to receive a point-to-multipoint data channel from a Radio Access Network and form a message including at least one of an indication of whether cell reselection parameters for a neighboring cell have been received by the mobile station conveyed by an indicator bit in a Multimedia Broadcast/Multicast Service neighboring cell report element of the message and an indication of whether the mobile station has received information indicating a set of parameters to be used in receiving the point-to-multipoint data channel in the neighboring cell conveyed by a two-bit indicator also included in the Multimedia Broadcast/Multicast Service neighboring cell report element of the message; and
   the mobile station also configured to transmit the message to the network on a packet associated control channel.

9. A mobile station, comprising:
   means for receiving a point-to-multipoint data channel from a network;
   means for forming a message including an indication of whether cell reselection parameters for a neighboring cell have been received by the mobile station and an indication of whether the mobile station has received information indicating a set of parameters to be used in receiving the point-to-multipoint data channel in the neighboring cell; and
   means for providing the message in a form suitable for transmission on a control channel to the network.

10. A mobile station, comprising:
    a hardware module configured to receive a point-to-multipoint data channel from a network, and configured to form a message including an indication of whether cell reselection parameters for a neighboring cell have been received by the mobile station and an indication of whether the mobile station has received information indicating a set of parameters to be used in receiving the point-to-multipoint data channel in the neighboring cell; and
    a further hardware module configured to provide the message in a form suitable for transmission on a control channel to the network.

11. A mobile station as in claim 10, wherein the apparatus is configured to also include in the message an indicator of the set of parameters received by the mobile station when the mobile station has received the neighboring cell information for the neighboring cell indicating a set of parameters to be used in receiving the point-to-multipoint data channel in the neighboring cell.

* * * * *